United States Patent [19]

Partridge

[11] 4,410,178
[45] Oct. 18, 1983

[54] GAMING MACHINES

[75] Inventor: David Partridge, West Wickham, England

[73] Assignee: Starpoint Electrics Limited, Morden, England

[21] Appl. No.: 378,810

[22] Filed: May 17, 1982

[30] Foreign Application Priority Data

May 21, 1981 [GB] United Kingdom ............... 8115605

[51] Int. Cl.³ ............................................. A63F 5/04
[52] U.S. Cl. .................................. 273/143 R; 464/70
[58] Field of Search ........... 273/143 R, 143 C, 143 D, 273/143 E, 142 H, 142 R, 142 J, 142 JA, 142 JB, 142 JC, 142 JD, 138 R, 138 A; 464/70, 82, 71, 85, 87; 403/355, 278, 379, 319

[56] References Cited

U.S. PATENT DOCUMENTS

| 2,550,517 | 4/1951 | Bales | 464/70 |
| 2,863,308 | 12/1958 | Flood | 464/71 |
| 3,733,075 | 5/1973 | Hooker et al. | 273/143 R X |
| 3,910,582 | 10/1975 | Richards | 273/143 R |
| 4,262,901 | 4/1981 | Heywood | 273/143 R |

Primary Examiner—Paul E. Shapiro
Attorney, Agent, or Firm—Larson & Taylor

[57] ABSTRACT

A reel unit for a gaming machine comprises a stepping motor 1 connected to drive the reel through a reduction gearbox 2 having an output shaft 3 coupled to a boss 5 forming part of the reel. The shaft end 3 forms a close fit with a circular opening 12 in the boss 5 and a transverse pin 8 extending through the shaft 3 is located in a transverse slot 14 in the face of the boss 5, the slot 14 being wider than the pin 8 and its sides engaging the pin only through a pair of resilient O-rings 9 on each extending portion of the pin 8, each O-ring being located in a respective recess 15 in the sides of the slot 14.

4 Claims, 3 Drawing Figures

GAMING MACHINES

This invention relates to gaming machines, sometimes referred to as fruit machines or amusement machines. As is well known, such machines include a mechanism comprising a number of reels marked along their circumferential edges with symbols such as fruit, the relative positions of which are determined by the rotary positions of the reels to determine whether or not a player has won. In the past, operation was usually purely mechanical, but such machines are now commonly electrically operated and initiation is by means of a suitable switch such as a pushbutton or rocker bar.

One suitable form of electrical drive is an individual stepping motor for each reel which may drive the reel through a reduction gear box. The use of a stepping motor has the advantage that the speed of rotation can be easily controlled by adjusting the pulse rate and under normal operating conditions can be kept at a standard value. Also the angle of rotation of the reel can be accurately controlled in accordance with the total number of pulses supplied to the motor. However, it also has a major disadvantage owing to unsatisfactory starting operation. The inertia of the reel presents a major load when starting from a standstill and there is a risk that the motor may stall completely. At best the start is jerky and irregular. A measure of improvement can be obtained by a reduction of the pulse rate from the standard value over an initial short period. This results in a slow motor output speed at which the motor will start, but it then has to be accelerated by increasing the pulse rate to the standard value and the start is still somewhat hesitant, leaving considerable room for improvement. The ideal is, of course, a clean, abrupt start such as that obtained by the sudden release of a spring when using a purely mechanical drive.

According to the present invention, the output shaft of the gear box is connected to the reel by means of a coupling in which the shaft end forms a close fit with a circular opening in a boss connected to or forming part of the reel structure and a transverse pin extending through the shaft is located in a transverse slot in the face of the boss, the slot being wider than the pin and its sides engaging the pin only through a layer of resilient cushioning material. As a consequence, the driving torque is transmitted to the reel through the cushioning material and it is found, most surprisingly, that the small degree of resilience thus introduced is sufficient to overcome the difficulties referred to above and to provide a crisp, clean start to the rotation of the reel, that is to say a smooth acceleration up to the standard running speed.

Preferably the cushioning material is constituted by at least one and preferably two O-rings of elastomeric material fitted on each extending portion of the pin and located in a respective recess in the sides of the slot. Other alternatives are possible, however, and the cushioning material may be constituted, for example, by a sleeve of elastomeric material fitted onto each extending portion of the pin or by an elastomeric lining to the slot. The use of O-rings is preferred because such rings are already available commercially which have extremely accurately defined physical properties. Thus both the dimensions and the elastic properties are determined within close limits so that the coupling can be reproduced with extreme accuracy.

An example of construction in accordance with the invention will now be described, with reference to the accompanying drawings, in which.

Figure 1:
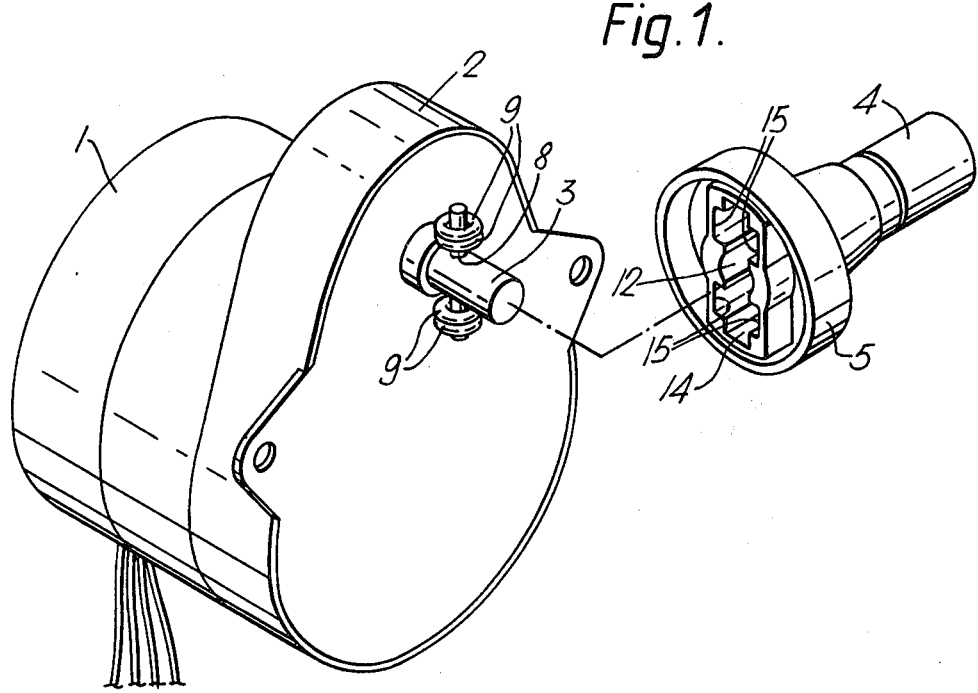
FIG. 1 is a perspective view showing a stepping motor and reduction gearbox with the two halves of a coupling separated.

Turning first to FIG. 1, a stepping motor 1 is fitted with a reduction gear box 2 having an output shaft 3 for connection to the reel to be driven. The reel itself is not illustrated in this view, but the drive is transmitted through a central hub portion 4 on which the reel is fitted and which is formed with a boss 5 for coupling to the shaft 3.

For coupling purposes, the shaft 3 is fitted with a transverse pin 8 which is located in a transverse hole in the shaft and extends equally on both sides. Each extending portion of the pin 8 is fitted with a pair of O-rings 9 of elastomeric material such as neoprene.

Figure 2:
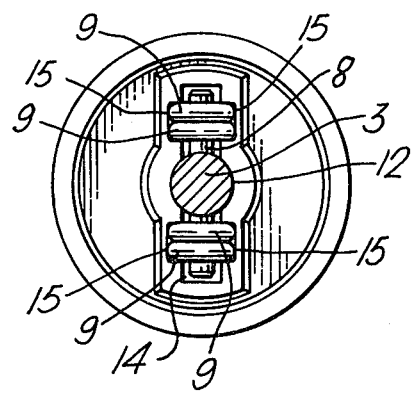
FIG. 2 is a cross sectional view showing the two halves of the coupling fitted together.

The face of the boss 5 is formed with a central opening 12 within which the end of the shaft 3 is a close fit. A transverse slot 14 extends symmetrically on either side of the opening 12, the shape of the opening and the slot being best seen from FIG. 2. As can be seen, although the shaft 3 forms a close fit within the opening 12, there is appreciable clearance between the ends and sides of the pin 8 and corresponding surfaces of the slot 14. The O-rings 9, however, form close fits within recesses 15 in opposite sides of the slot 14.

As a consequence of this construction, torque transmitted from the shaft 3 to the boss 5 passes through the O-rings 9 which are slightly compressed in the process and thereby provide a degree of cushioning which is found to lead to the improved results previously described.

In a particular example the pin 8 has a diameter of 2.00 mm and the O-rings 9 are of a type commercially available from Dowty Seals Limited, Ashchurch, Gloucester, England, under the description Type no: 200-004-5575.

Figure 3:
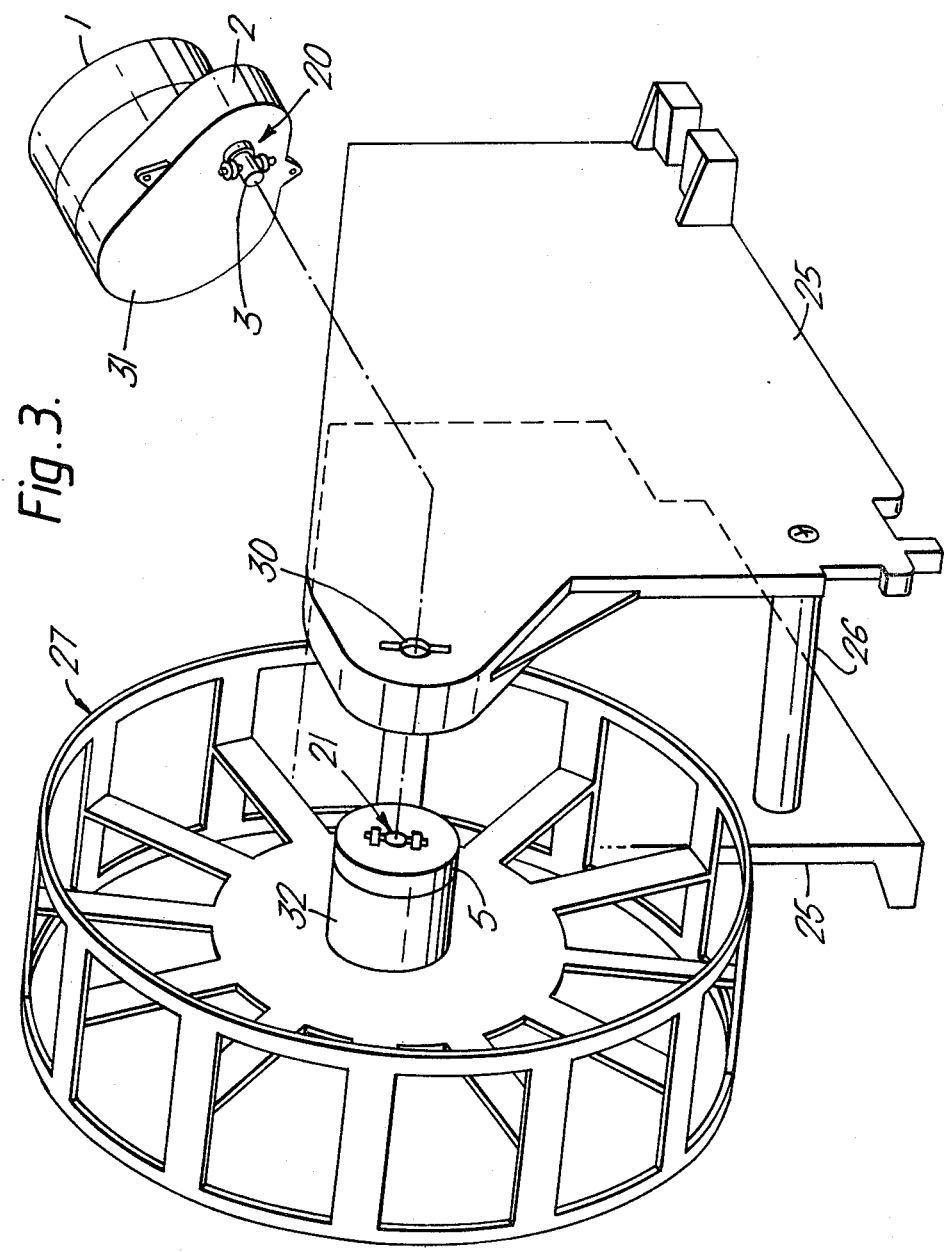
FIG. 3 is an exploded perspective view of a reel module including the drive mechanism shown in FIG. 1.

FIG. 3 is a simplified perspective view of a complete reel unit in the form of a self-contained module comprising a pair of side plates 25 spaced by rods, one of which is seen at 26. The reel itself is shown as 27 and is in the form of a light, open-work structure to the outer circumference of which a strip carrying the required gaming symbols is secured in the usual way.

The reel is mounted for rotation between the two side plates 25, the supporting shaft at the right hand side as seen in the Figure being constituted by the output shaft 3 of the gear box 2. In this view for simplicity, the male part of the coupling is indicated as 20 and the female part as 21. The right hand plate 25 is formed with an appropriately shaped opening 30 for the passage of the male part 20 of the coupling during assembly, and the flat face 31 of the gear box 2 fits flush against the side of the plate 25, thus supporting both the gear box 2 and the motor 1. The central hub portion 4 seen in FIG. 1 fits into a recess in a central boss 32 forming part of the structure of the reel 27 so that the latter is supported by the shaft 3.

The construction just described provides a compact, self-contained module which can readily be mounted side by side with similar modules to form the normal array of reels for a complete gaming machine. By use of the coupling 20, 21 for the drive to the reel 27 in each module, it is possible to obtain a clean, abrupt start to the rotation of the reel without the difficulties referred to previously.

I claim:

1. In a reel unit for a gaming machine said unit comprising a reel, a stepping motor and a reduction gearbox having an output shaft, said stepping motor being connected to drive said reel through said reduction gearbox, the improvement comprising a coupling between said output shaft of said gearbox and said reel, said coupling comprising a transverse pin extending through said output shaft, a boss in rigid relationship with said reel, said boss being formed with an axial circular opening, said opening forming a close fit with said output shaft, said boss being further formed with a transverse slot receiving said transverse pin, said slot being wider than said pin, and a layer of resilient cushioning material between said pin and said slot.

2. A reel unit according to claim 1 wherein said cushioning material is constituted by at least one O-ring on each extending portion of said pin, each said O-ring being located in a respective recess in said slot.

3. A reel unit according to claim 2 and wherein there are two O-rings on each extending portion of said pin, each O-ring being located in a respective recess.

4. A reel unit for a gaming machine, said unit being in the form of a self-contained module, said module comprising a pair of side plates, means spacing said side plates apart, a reel, means mounting said reel for rotation between said side plates, a drive unit comprising a stepping motor and a reduction gearbox having an output shaft, said drive unit being mounted on one of said side plates, and a coupling connecting said output shaft to said reel, said coupling comprising a transverse pin passing through said output shaft to define an extending portion of said pin on each side of said shaft, at least one resilient O-ring on each extending portion of said pin, a boss in rigid relationship with said reel, said boss being formed with an axial circular opening, said opening forming a close fit with said output shaft, said boss being further formed with a transverse slot receiving said transverse pin, said slot being formed with respective recesses receiving said O-rings whereby said transverse pin is spaced from the sides of said transverse slot and said O-rings define resilient cushioning material between said pin and said slot.

* * * * *